United States Patent [19]
Rambauske

[11] Patent Number: 4,595,288
[45] Date of Patent: Jun. 17, 1986

[54] METHOD AND APPARATUS FOR MEASURING DEEP MIRRORS

[75] Inventor: Werner Rambauske, Carlisle, Mass.

[73] Assignee: Varo, Inc., Garland, Tex.

[21] Appl. No.: 535,839

[22] Filed: Sep. 26, 1983

[51] Int. Cl.$^4$ .......................... G01B 9/00; G01B 11/24
[52] U.S. Cl. ..................................... 356/124; 356/237; 356/241; 356/371; 356/376
[58] Field of Search ..................... 356/124, 124.5, 237, 356/241, 371, 376, 445

[56] References Cited

U.S. PATENT DOCUMENTS

| | | | |
|---|---|---|---|
| 2,430,870 | 11/1947 | Goldberg et al. | 356/124 |
| 3,877,788 | 4/1975 | Sprague et al. | 356/124 |
| 3,892,494 | 7/1975 | Baker et al. | 356/124 |

FOREIGN PATENT DOCUMENTS 0267084  4/1970  U.S.S.R. ............................ 356/124

*Primary Examiner*—R. A. Rosenberger
*Assistant Examiner*—Crystal Cooper
*Attorney, Agent, or Firm*—Jerry W. Mills; Gregory M. Howison

[57] ABSTRACT

A measuring apparatus (11) for measuring the contours of a deep mirror (10) includes a laser (14) for generating a light beam (20). The light beam impinges upon a reflecting surface (16) for reflection therefrom to a point P. The light ray is then reflected from the point P back to the flat reflecting surface (16) and then to an intersection point (34). An axial reflecting surface (36) disposed normal to a central axis (12) reflects the light beam to a second reflecting surface (18). The light ray is reflected off of this surface to a point Q on the inner surface of the mirror (10). The point Q is diametrically opposite the central axis (12) from the point P. The light beam reflected from the point Q is then reflected to the reflecting surface (18) and then to a detector (50) which detects positional deviations in the path of the light beam. The mirror (10) is moved about the central axis (12) relative to the measuring apparatus such that the points P and Q traverse the surface thereof. A processing unit (52) and a positional mechanism (54) are provided to correlate the positional deviations in the light ray path and the relative position of the mirror (10).

41 Claims, 4 Drawing Figures

METHOD AND APPARATUS FOR MEASURING DEEP MIRRORS

TECHNICAL FIELD

The present invention pertains in general to the measurement of optical surfaces and, more particularly, to the measurement of the optical surfaces of deep mirrors.

BACKGROUND OF THE INVENTION

Measurement of the exact contour of a deep mirror to determine the accuracy of the inner and outer surface slopes, failures, and roughness of rotational or partially rotational deep mirrors has, in the past, been a very tedious and difficult process. In utilizing prior measurement techniques for the inspection of optical surfaces such as mirrors and prisms, considerable difficulties are experienced in detecting defects in these surfaces. This is due, in part, to the fact that the defects have only a very small influence on the incident light. Although, in theory, it is possible to discriminate between light which follows the desired path of a perfectly inspected optical component from light which is slightly deviated as the result of imperfections in the surface of the optical device, this is virtually impossible as a practical matter..

Present methods for measuring optical surfaces utilize an external light beam that is either scanned across the optical surface or the optical surface is moved relative to the light beam and the reflected beam measured. Inherent imperfections in the various mechanisms that are utilized to either scan the light beam or move the optical surface can sometimes result in greater errors than those resulting from the imperfections on the actual optical surface. Examples of these measurement devices are disclosed in U.S. Pat. Nos. 3,892,494 and 3,877,788.

In view of the above disadvantages, there exists a need for a measurement system that alleviates or compensates for the inaccuracies in the measurement system itself such that a higher degree of accuracy and measurement efficiency can be achieved.

SUMMARY OF THE INVENTION

The present invention disclosed and claimed herein comprises a method and apparatus for measuring the integrity of the optical surfaces of a mirror having a symmetrical axis. The apparatus includes a generator for generating a light ray and a first optical system for directing the light ray to impinge upon the surface of the mirror at a first point and then intersect with the symmetrical axis. A second optical system is provided for directing the light ray from the intersection point to impinge upon a second point on the surface of the mirror on the opposite side of the symmetrical axis from the first point, the reflected light ray from the second point directed to an external location. A detector is provided at the external location for detecting positional deviations of the light ray directed to the external location. The first and second optical systems maintain the angular position of the light ray directed to the external point as the position of the mirror is varied about its symmetrical axis. Positional deviations at the detector indicate imperfections in the optical surface and contour of the deep mirror.

In yet another embodiment of the present invention, a first reflecting surface is provided to reflect the generated light ray therefrom for impingement upon the first point on the surface of the mirror. The first reflecting surface is oriented such that the light ray is reflected from the first point on the surface of the mirror back to the first reflecting surface and then to the intersection point with the symmetrical axis. An axial reflecting surface is disposed normal to the symmetrical axis at the intersection point such that the intersecting light ray is reflected to the opposite side of the symmetrical axis. A second reflecting surface is disposed on the opposite side of the symmetrical axis with respect to the first reflecting surface and positioned in the path of the light ray reflected from the axial reflecting surface such that the reflected ray therefrom impinges on the second point on the surface of the mirror. The light ray reflected from the second point is reflected off of the second reflecting surface to the external location point.

In yet another embodiment of the present invention, the mirror to be measured has the reflecting surface on the exterior thereof. The generated light ray is directed to impinge upon a first point on the reflecting surface of the mirror to be reflected to a first reflecting surface external to the deep mirror. The first reflecting surface is oriented such that the impinging light ray is reflected to intersect with the symmetrical axis. An axial reflecting surface is disposed at the intersection point of the symmetrical axis and normal thereto for reflecting the light ray to the opposite side of the symmetrical axis to impinge upon a second reflecting surface disposed opposite the symmetrical axis from the first reflecting surface. The light ray reflected off the second reflecting surface impinges upon a second point on the reflecting surface of the mirror for reflection to the external location to be detected by the detector. This arrangement of reflecting surfaces allows the external surface of the mirror to be measured as the mirror is moved about the symmetrical axis relative to the reflecting surfaces.

In a further embodiment of the present invention, a method is provided that comprises the steps of first generating a light ray and directing the light ray to impinge upon a first point on the optical surface of a deep mirror. The light ray is then directed from the first point to intersect with the symmetrical axis. At the intersection with the symmetrical axis, the light ray is directed to the second point on the optical surface of the mirror. The light ray reflected off of the second point is then directed to the external location and positional deviations of that light ray are detected.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
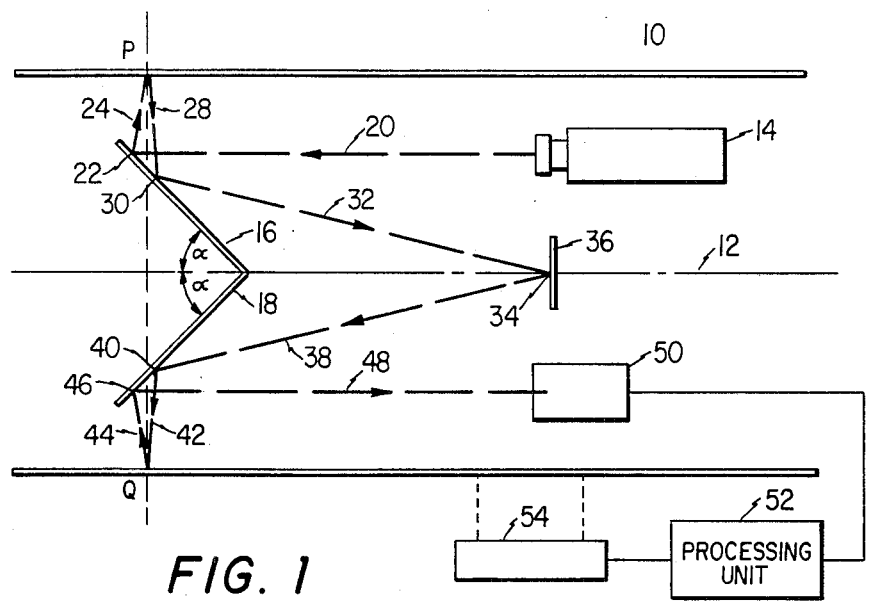
FIG. 1 illustrates a cross-sectional view of a cylindrical deep mirror and a ray diagram of the light rays involved in the measurement apparatus.

Referring now to FIG. 1, there is illustrated a cross-sectional view of a cylindrical deep mirror 10 with a measurement apparatus 11 disposed internal thereto. The cylindrical mirror 10 has a central axis 12 which, for a cylindrical structure, is the symmetrical axis also. The measurement apparatus 11 instructs a laser 14 to generate a coherent light beam having a very small cross-sectional area. In the preferred embodiment, the laser 14 is a helium neon (He-Ne) laser. A flat reflecting surface 16 is disposed internal to the mirror 10 and between the central axis 12 and the surface of the mirror 10, the reflecting surface thereof forming an angle $\alpha$ with respect to the central axis 12. A flat reflecting surface 18 is disposed internal to the mirror 10 between the central axis 12 and the inner surface thereof at an angle $\alpha$ with respect to the central axis 12. The flat reflecting surface 18 is the mirror image of the flat reflecting surface 16, the central axis 12 being the axis of symmetry therefor. Both reflecting surfaces 16 and 18 are integral parts of the measurement apparatus 11.

The laser 14 generates a light beam represented by a light ray 20 (hereinafter all light beams and reflections thereof will be referred to as light rays). The light ray 20 impinges upon the flat reflecting surface 16 at a point 22 resulting in a reflecting ray 24. The angle of reflection of the ray 24 with respect to the normal to the surface 16 is equal to the angle of incidence of ray 20 with respect to the normal. The ray 24 is directed toward the inner surface of the mirror 10 and impinges thereupon at a point P. Since this surface is also the reflecting surface, a reflecting ray 28 results and is directed to impinge upon the flat reflecting surface 16 at a point 30 resulting in a reflected ray 32 that is oriented to intersect the central axis 12 at an intersection point 34. The ray intersection point 34 is disposed on the side of the reflecting surfaces 16 and 18 from which the light ray 20 is generated. For an ideal surface, the normal for the point P is perpendicular to the central axis 12. However, an imperfection in the surface of the mirror 10 can cause a deviation of the angle that the normal forms with the central axis 12, thus causing the ray 32 to deviate with respect to the central axis 12.

In the preferred embodiment, the laser 14 is positioned such that the light ray 20 is parallel to the central axis 12. The flat reflecting surface 16 is positioned such that the angle $\alpha$ with respect to the central axis 12 is greater than 45°. This results in the angle between the incident ray 20 and reflected ray 24 on the flat reflecting surface 16 being less than 90° and the angle between the rays 28 and 32 being greater than 90°. By increasing the angle $\alpha$, the intersection point 34 can be moved closer to the flat reflecting surfaces 16 and 18 and, by decreasing the angle $\alpha$, the intersection point 34 can be moved away from the flat reflecting surfaces 16 and 18.

An axial reflecting surface 36 is disposed at the intersection 34 with the reflecting plane thereof disposed perpendicular to the central axis 12. Since this reflecting plane is perpendicular to the central axis 12, the ray 32 passing through the intersection point 34 results in a reflected ray 38 that forms an angle with respect to the central axis 12 equal to the angle formed therewith by the ray 32.

The ray 38 impinges upon the flat reflecting surface 18 at a point 40 and a reflecting ray 42 results therefrom that impinges upon a point Q on the inner surface of the mirror 10. A reflecting ray 44 is reflected from the point Q and impinges upon the reflecting surface 18 at a point 46, resulting in a light ray 48 reflected therefrom. Since the flat reflecting surface 18 is the mirror image of the flat reflecting surface 16 and the axial reflecting surface 36 is disposed perpendicular to the central axis 12, the light ray 48 is the mirror image of the light ray 20. In addition, the light rays 44, 42 and 38 are the mirror images of the lights rays 24, 28 and 32 respectively. This results in the points P and Q being on diametrically opposite sides of the mirror 10 and all of the light rays and the points P and Q existing in a common plane.

A detector 50 is disposed in the path of the light ray 48 for measuring the position thereof and is an integral part of the measurement apparatus 11. A processing unit 52 is provided and connected to the detector 50 for processing the positional information of the light ray 48. A positioning mechanism 54 is disposed adjacent the mirror 10 and connected to the processing unit 52. The positioning mechanism 54 is operable to move the mirror 10 about its central axis 12 in both longitudinally and rotationally. However, the measurement apparatus 11 can be moved relative to the symmetrical axis 12 relative to the mirror. The information supplied to the processing unit 52 is positional information such that the relative position of the light ray 48 with respect to the detector 50 and the relative position of the mirror 10 with respect to its central axis 12 can be correlated.

Referring further to FIG. 1, the description of the measurement apparatus 11 will be described in more detail. The mirror 10 with no imperfections in the surface thereof and with a cylindrical conformation therefor defines the normals to the surface at points P and Q as perpendicular to the central axis 12. If the light ray 20 is positioned parallel to the central axis 12 and the light ray 32 intersects with the central axis 12, the light ray 48 will also be parallel to the central axis 12, thus forming a reference position on the detector 50. The mirror 10 is then moved about its central axis 12 in both the longitudinal direction and the rotational direction with the measurement apparatus 11 remaining fixed. However, it should be understood that the measuring apparatus 11 with the laser 14, detector 50 and the reflecting surfaces 16, 18 and 36 can also be moved with the mirror 10 remaining stationary. Regardless of whether the position of the measuring apparatus 11 or the position of the mirror 10 is varied, it is the relative motion of the two that enables the measurement to be made.

If the surface of the mirror has imperfections that are less than the measurement accuracy of the apparatus 11 and the positioning mechanism 54 accurately moves the mirror 10 about its central axis 12, the light ray 48 will remain at a constant position on the surface of the detector 50. However, if a slight imperfection at either point P or point Q is encountered, the normal to the surface at either point P or point Q will change. For example, if the imperfection occurs at point P, the angle between the light ray 24 and the light ray 28 will be altered. This in turn will change the position of the point 30 at which the light ray 28 impinges upon the flat reflecting surface 16 and the angle between the light ray 28 and the light ray 32. If the normal to the point P deviates from a perpendicular position with respect to the central axis 12 such that the angle between the light rays 24 and 28 increases, the angle of incidence and the angle of reflection of each of the light rays 28, 32, 38, 42, and 48 will increase to change the position of the light ray 48 on the face of the detector 50. Since the angle between the light rays 24 and 28 has increased, an angular deviation will occur at each of the points P, 30, 34, 40, Q and 46. This angular deviation is the angular deviation with respect to the normal at the various points and this deviation will be magnified by a factor of 64, that is, $2^6$. If, on the other hand, the imperfection occurs at the point Q, the angular deviation will only be magnified by a factor of 4 since the reflection only occurs at the point Q and the point 46 (i.e. $2^2$). By rotating the mirror 180°, the imperfection can be switched from the point P to the point Q to determine the positional information with respect to a reference. In addition, if an imperfection exists at both P and Q of equal magnitude, the deviation at the detector will be magnified by a factor of 68, which is the sum of both deviations. Therefore, the plurality of reflections from stationary surfaces magnifies positional deviations.

In order to obtain reasonably complete data for the surface of the mirror 10, it is necessary to provide both a rotational motion and a longitudinal motion about the central axis 12. The rotational motion can be either a full 360° rotation or a periodic angular motion. The positional information of the mirror with respect to the measuring apparatus 11 is input to the processing unit 52 for utilization in correlating the information received from the detector 50. In order to accomplish this, a Fourier analysis or similar analysis is performed on the data.

In the preferred embodiment, it is desirable that the central axis 12 of the mirror also be the central axis of the measuring apparatus 11 from which the angles $\alpha$ for the flat reflecting surfaces 16 and 18 are measured and the intersection point 34 exists. However, there can be two separate axes, one representing the central axis of the mirror about which the mirror is positioned and one for referencing of the angles $\alpha$ and the intersection point 34. Of course, with offset axes, rotation of the mirror 10 about its central axis will then result in a periodic deviation in both the normals to the point P and the point Q. However, a Fourier analysis can be performed on the measurement data and a correction factor inserted to remove the error due to the offset of the two axes.

Figure 2:
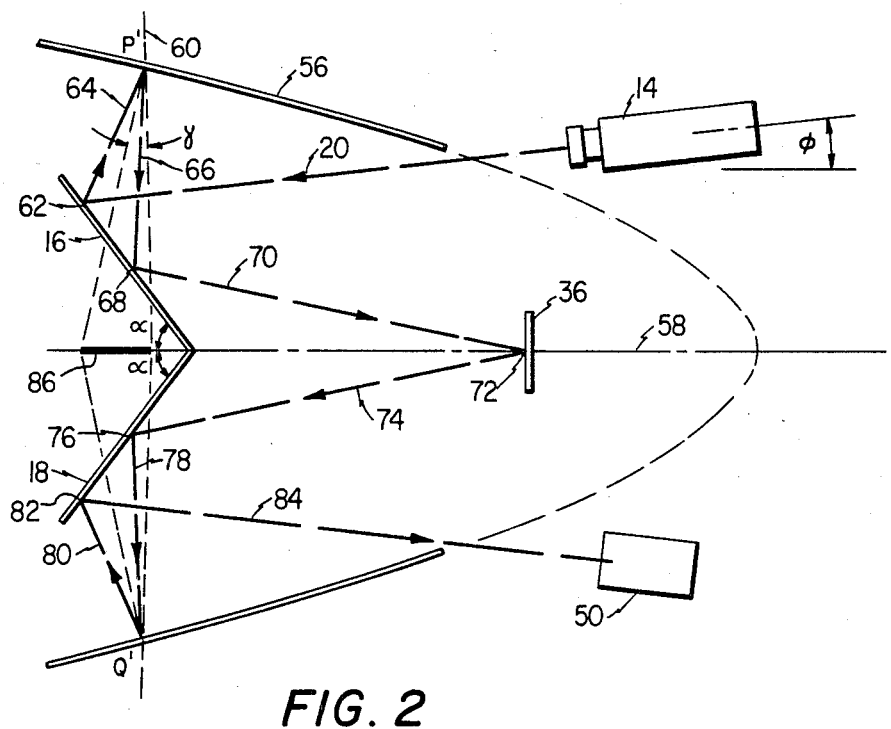
FIG. 2 illustrates a cross-sectional diagram of the measurement apparatus with a parabolic deep mirror.

Referring now to FIG. 2, there is illustrated the measuring apparatus 11 of FIG. 1 with a mirror 56 configured as a paraboloid, wherein like numerals refer to like parts in the various figures. The mirror 56 has a central axis that is aligned with an X axis 58 of a Cartesian coordinate system. The coordinate system also has a Y axis 60. The laser 14 is disposed at an angle $\phi$ with respect to the X axis 58 such that the light ray 20 generated thereby impinges upon a point 62 on the flat surface 16, resulting in a reflected ray 64 that impinges upon a point P' on the inner surface of the mirror 56. Since the surface of the mirror 56 defines a paraboloid, the normal to the surface thereof does not coincide with the Y axis 60 but, rather, it forms at an angle $\gamma$ therewith.

A light ray 66 is reflected off of the point P' to a point 68 on the flat reflecting surface 16, resulting in a light ray 70 that is reflected therefrom for intersection with the X axis 58 at an intersection point 72. At the intersection point 72, the axial reflecting surface 36 is positioned thereat to reflect the light ray 70 as a light ray 74, the normal to the axial reflecting surface 36 coinciding with the X axis 58. The light ray 74 impinges upon the flat reflecting surface 18 at a point 76 and a light ray 78 is reflected therefrom to impinge upon a point Q' on the inner surface of the mirror 56. The point Q' is diametrically opposite the X axis 58 from the point P'. A light ray 80 is reflected from the point Q' and impinges upon a point 82 on the flat reflecting surface 18. A light ray 84 is reflected from the point 82 and impinges upon the surface of the detector 50. As will be described hereinbelow, the flat reflecting surfaces 16 and 18 are disposed at an angle $\alpha$ with respect to the X axis 58 and, as such, the angle that the light ray 84 makes with respect to the X axis 58 is identical to the angle $\phi$. Therefore, the detector 50 must be positioned at this angle to detect the positional deviations in the light ray 84.

The angle $\gamma$ is determined by the length of the subnormal of the paraboloid, indicated by reference numeral 86, that is a constant determined by analytic geometry. Thus, as the mirror 56 is moved along the X axis 58 and the flat reflecting surfaces 16 and 18 are moved away from the focal point of the paraboloid, the angle $\gamma$ decreases since the distance from the X axis 58 to the points P' and Q' along the Y axis increases. Analytic geometry is utilized to calculate the distance of the axial reflecting surface 36 from the intersection point with the X axis 58 of the flat reflecting surfaces 16 and 18 such that the intersection of the light ray 70 with the X axis at the intersection point 72 is maintained for all positions of the mirror 56 along the X axis.

Figure 3:
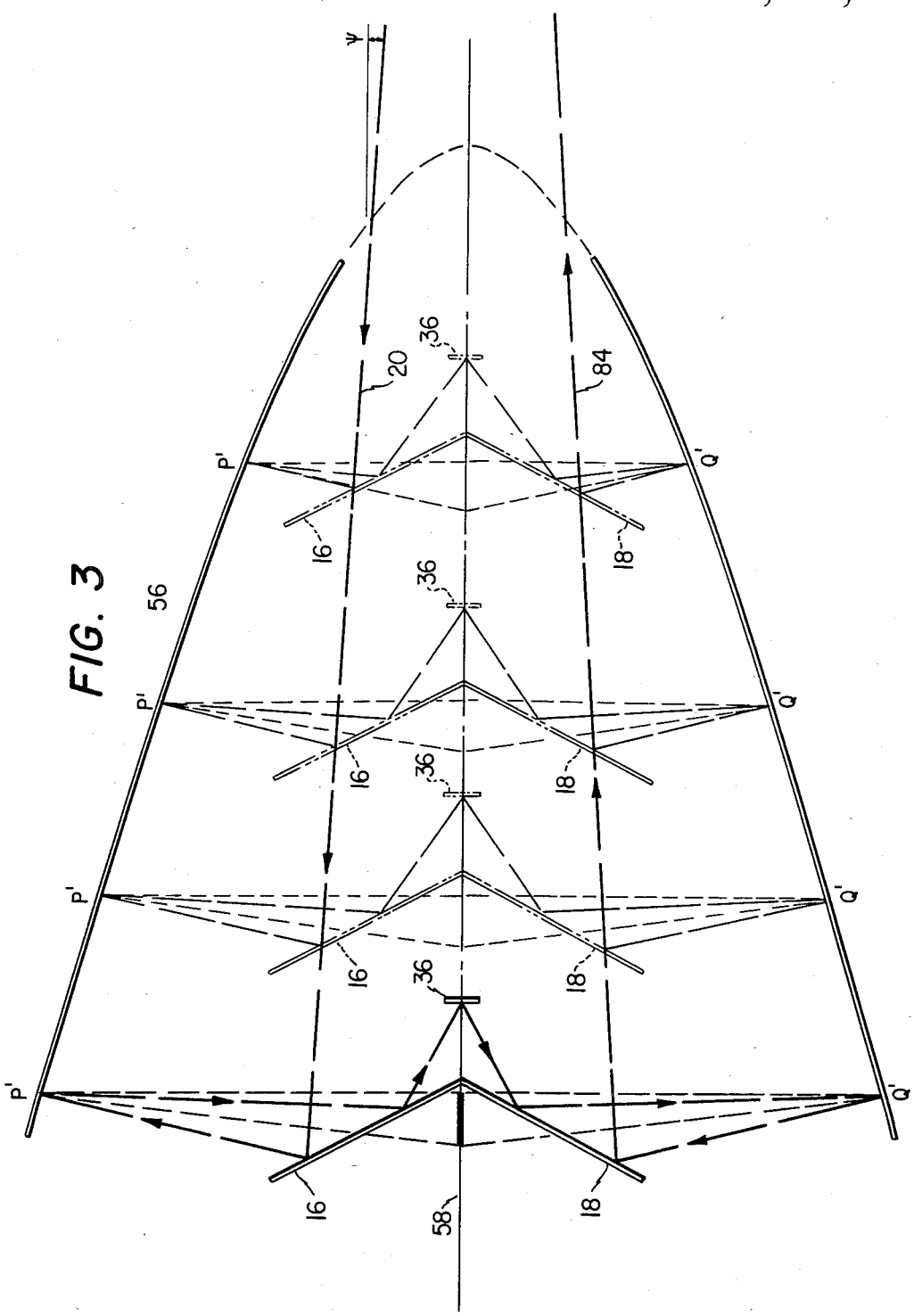
FIG. 3 illustrates a sequential ray diagram for the parabolic mirror of FIG. 2 depicting different positions of the deep mirror along its symmetrical axis.

Referring now to FIG. 3, there is illustrated a sectional diagram of the mirror 56 of FIG. 2 illustrating the mirror 56 in various positions along the X axis 58 with the light ray 20 entering the mirror 56 at the angle $\phi$. The angle is reversed from the embodiment of FIG. 2 to make it more convenient for measurement purposes. However, it should be understood that the arrangement of the flat reflecting surfaces 16 and 18 and the axial reflecting surface 36 remain the same as that described above with reference to FIG. 2.

If the deep mirror to be measured has a hyperbolic or an elliptical configuration, two solutions for the measurement problem exist. Hyperbolic or elliptical contour curves are similar to parabolic curves in that they all possess gradual deviations from the exact straight zero line as they progress along the central axis thereof. These gradual deviations indicate the exact coordinates for the hyperbola or the ellipse. In order to measure the hyperbolic or elliptical surfaces, the reflectors 16 and 18 have the surfaces thereof modified such that they are not flat but, rather, possess a parabolic contour in the plane of the reflections. The solution to this can be derived with analytic geometry. This will enable the measurement procedure to proceed as described above with respect to FIGS. 1 and 2. Regardless of the contour of the deep mirror to be measured, a corresponding contour for the reflecting surfaces 16 and 18 can be calculated and fabricated. For example, this contour can be fabricated on a small prism surface.

In an alternate embodiment, the laser 14 can have the output there polarized vertical to the reflection plane of to avoid unwanted scatter. In addition, the axial reflecting surface 36 can be positioned exactly to the intersection point of the light rays with respect to the X axis 58 by micrometer screw to provide a fine adjustment for the measuring apparatus 11.

Figure 4:
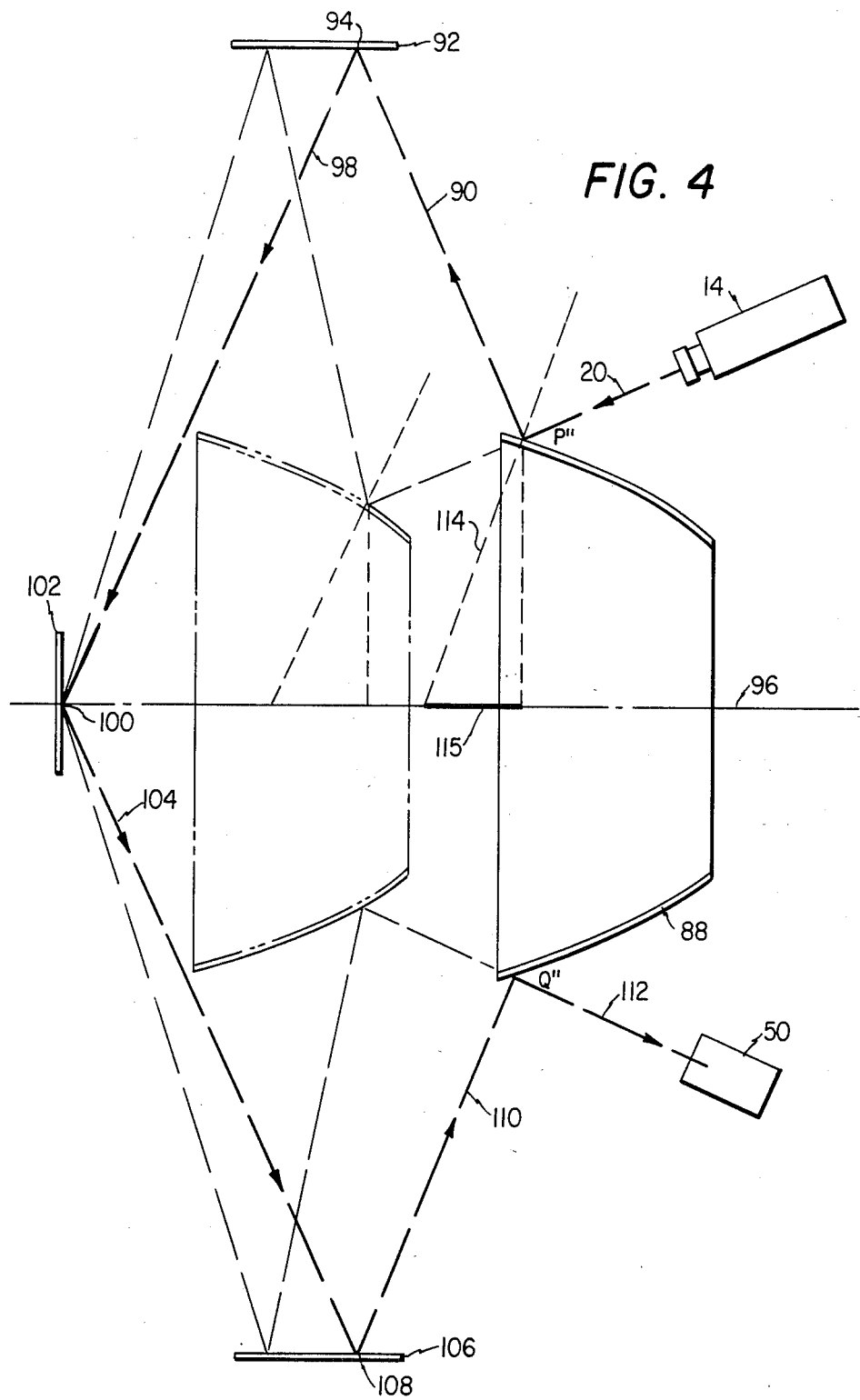
FIG. 4 illustrates an alternate embodiment of the measurement apparatus for measuring the external surface of a deep mirror.

Referring now to FIG. 4, there is illustrated an alternate embodiment of the present invention, wherein like numerals refer to like parts of various figures. A deep mirror 88 has the reflecting surface thereof disposed on the external side thereof and a central axis 96 for movement thereabout. The laser 14 is oriented such that the light ray 20 impinges upon a point P'' on the exterior surface thereof, resulting in a reflected light ray 90. A flat reflecting surface 92 is disposed external to the mirror 88 and in the path of the light ray 90 such that the light ray 90 impinges upon the surface thereof at a point 94. The reflecting surface 92 is parallel to the central axis 96.

A light ray 98 is reflected off of the point 94 on the flat reflecting surface 92 and intersects with the X axis 58 at an intersection point 100. An axial reflecting surface 102 is disposed at the intersection point 100 and normal to the central axis 96 such that a light ray 104 is reflected from the intersection point 100. A flat reflecting surface 106 is disposed in the path of the light ray 104, the reflecting plane thereof oriented parallel with the central axis 96. The flat reflecting surface 106 is the mirror image of the flat reflecting surface 92 such that the light ray 104 impinges upon the surface thereof at a point 108, resulting in a light ray 110 reflected therefrom. The light ray 110 impinges upon a point Q″ on the exterior surface of the mirror 88. The point Q″ is diametrically opposite the central axis 96 from the point P″. A light ray 112 is reflected off of the point Q″ to the detector 50 which is positioned at an angle with respect to the central axis 96. As described above with FIGS. 1-3, the angle that the light ray 28 forms with the central axis 96 is equal to the angle that the light ray 112 forms with the central axis 96, since the reflecting surface 106 is the mirror image of the reflecting surface 92 and the axial reflecting surface 102 is disposed normal to the central axis 96 at the intersection point 100.

As illustrated in FIG. 4, the mirror 88 is a paraboloid. Therefore, the point P″ has a normal 114 that forms an angle with respect to the perpendicular to the central axis 96. As described above with reference to FIG. 2, a paraboloid has a subnormal (referred to by reference numeral 115) that remains constant for all positions of the point P″ and Q″ as the mirror 88 is moved along its central axis 96. A second position of the mirror 88 is illustrated in phantom lines showing the light ray path for a different position of the mirror 88 on the central axis 96 with the light ray path therefor coinciding both at the intersection point 100 and the path of the light ray 112. Although not shown, the detector 50 is connected to the positioner 54 and the processing unit 52 for determining imperfections in the optical surfaces by positional deviations in the light ray 112. As described above, the flat reflecting surfaces 92 and 106 can have a different contour to measure mirror contours other than cylindrical or parabolic.

In summary, there has been provided a measuring apparatus that measures the optical integrity of the reflecting surface on a deep mirror by moving the deep mirror relative to the measuring apparatus. The measuring apparatus includes a laser for generating a narrow light beam and two reflecting surfaces disposed on opposite sides of the central axis of the deep mirror in a symmetrical manner. The light ray is directed towards one of the reflecting surfaces to reflect therefrom to impinge upon a first point on the surface of the deep mirror. The light ray is then reflected back towards the reflecting surface for reflection therefrom to intersect with the central axis. An axial reflecting surface is disposed at the intersection point and normal therewith to reflect the intersecting light beam to the other side of the central axis to impinge upon the other of the symmetrical reflecting surfaces. The light ray reflected off of this reflecting surface impinges upon the surface of the deep mirror at a second point that is diametrically opposite the first point. The light ray then reflects from this point off of the other reflecting surface to a detector. The detector detects positional deviations in the light ray that results from imperfections in the surface of the deep mirror. It is only necessary to move the deep mirror about its central axis in both the longitudinal direction and the rotational direction to achieve a measurement. Data from the detector can be processed and correlated with positional information of the mirror to further enhance the measurement procedure.

Although the preferred embodiment has been described in detail, it should be understood that various changes, substitutions and alterations can be made therein without departing from the spirit and scope of the invention as defined by the appended Claims.

What is claimed is:

1. An apparatus for measuring the quality of the optical surfaces of a mirror having a symmetrical axis, comprising:
   means for generating a light ray;
   first stationary directing means for directing the light ray to impinge upon a first point on the optical surface of the mirror, the reflected light ray therefrom directed to intersect the symmetrical axis at a predetermined intersection point;
   a stationary axial reflecting surface disposed at said predetermined intersection point and perpendicular to the symmetrical axis for reflecting the light ray incident thereon;
   second stationary directing means for directing the light ray reflected from said axial reflecting surface to impinge a second point on the optical surface of the mirror and symmetrical with respect to the first point and the the symmetrical axis, the reflected light ray therefrom directed to an external point;
   detecting means for detecting positional deviations in the light ray at the external point;
   means for moving the mirror longitudinally along and rotationally about its symmetrical axis relative to said first and second directing means, said axial reflecting surface, said generating means and said detecting means; and
   said first and second directing means and said axial reflecting surface maintaining the position of the ight ray at said external point constant as the position of the mirror is varied longitudinally along and rotationally about the symmetrical axis thereof, positional deviations at said detecting means indicating imperfections in the optical surface of the mirror.

2. The apparatus of claim 1 wherein said generating means generates the light ray in a direction having a predetermined angle with respect to the symmetrical axis.

3. The apparatus of claim 2 wherein the light ray directed to said external point forms an angle with the symmetrical axis essentially equal to the angle of the light ray generated by said generating means.

4. The apparatus of claim 1 wherein the light ray generated by said generating means is parallel to the symmetrical axis.

5. The apparatus of claim 1 wherein the light ray and all intermediate reflections thereof between said generating means and said first point is in a common plane.

6. The apparatus of claim 1 wherein each of said first and second directing means utilizes a plurality of intermediate internal reflections such that positional deviations due to an imperfection on the optical surface of the deep mirror are magnified.

7. The apparatus of claim 1 wherein the inner surface of the mirror is the reflecting surface to be measured and:

said first directing means comprises a first reflecting surface disposed in the path of the light ray and oriented to direct light ray to impinge upon the inner surface of the deep mirror at such an angle that the reflected light ray therefrom is directed back towards the surface of said first reflecting surface to be reflected therefrom to intersect with the symmetrical axis at the predetermined intersection point; and said second directing means comprises a second reflecting surface disposed in the path of the light ray reflected from said axial reflecting surface and oriented to direct the light ray to impinge upon the second point at such an angle that the reflected light ray therefrom is directed back towards the surface of said second reflecting surface to be reflected therefrom to said external point.

8. The apparatus of claim 7 wherein said first, second and axial reflecting surfaces are planar for measurement of the optical integrity of a mirror with a cylindrical or parabolic profile.

9. The apparatus of claim 7 wherein said first and second reflecting surfaces have a profile determined by the profile of the reflecting surface of the mirror such that the positional deviation of the light ray at said external point is the result of imperfections in the optical surface of the mirror.

10. The apparatus of claim 7 wherein said first and second reflecting surfaces are positioned about the symmetrical axis such that said second reflecting surface is the mirror image of said first reflecting surface.

11. The apparatus of claim 1 wherein the exterior surface of the mirror is the reflecting surface to be measured and further:

said light ray from said generating means directed towards said exterior surface of the mirror to impinge upon the first point, the first point on the exterior of the mirror;

said first directing means comprising a first reflecting surface disposed in the path of the reflected light ray from the first point and oriented parallel to the symmetrical axis to direct the light ray to the predetermined intersection point with the symmetrical axis; and said second directing means comprising:

a second reflecting surface disposed parallel to the symmetrical axis in the path of the reflected light ray from said axial reflecting surface and oriented to direct the light ray to impinge the exterior surface of the mirror at the second point on the exterior surface of the mirror, the reflected light ray from the second point directed to said detecting means.

12. The apparatus of claim 11 wherein said first and second reflecting surfaces are planar for measurement of the optical integrity of the mirror having a cylindrical or parabolic exterior profile.

13. The apparatus of claim 11 wherein said first and second reflecting surfaces have a profile determined by the profile of the mirror such that the positional deviations of the light ray at said detection means are the result of imperfections in the optical surface of the mirror.

14. The apparatus of claim 11 wherein said first and second reflecting surfaces are positioned about the symmetrical axis such that said second reflecting surface is the mirror image of said first reflecting surface.

15. An apparatus for measuring the optical integrity of the inner reflecting surface of a deep mirror having a symmetrical axis, comprising:

means for generating a light ray directed towards the interior of the deep mirror at a predetermined angle;

a first stationary reflecting surface disposed in the path of the light ray and positioned such that the light ray is reflected therefrom to impinge upon a first point on the inner surface of the deep mirror at an angle thereto such that the reflected light ray therefrom is reflected off of the surface of said first reflecting surface to intersect with the symmetrical axis at a predetermined intersection point;

a stationary axial reflecting surface having the reflecting surface thereof disposed normal to the symmetrical axis at the predetermined intersection point;

a second stationary reflecting surface disposed in the path of the light ray reflected from said axial reflecting surface and positioned such that the light ray is reflected therefrom to impinge upon a second point on the inner surface of the deep mirror at an angle thereto such that the reflected light ray therefrom is reflected off of the surface of said second reflecting surface to a point external to the deep mirror, the second point being symmetrical with respect to the first point;

a detector for detecting positional deviations in the reflected light ray received at the external point from said second reflecting surface; and means for moving the deep mirror both longitudinally along and rotationally about the symmetrical axis relative said first and second reflecting surfaces, said axial reflecting surface, said generating means and said detecting means;

said first and second reflecting surfaces and said axial reflecting surface maintaining the position of the light ray detected by said detector essentially constant as the position of the deep mirror is varied longitudinally along and rotationally about the symmetrical axis thereof, positional deviations at said detecting means indicating imperfections in the optical surface of the deep mirror.

16. The apparatus of claim 15 wherein the light ray output by said generating means is parallel to the symmetrical axis and the reflected light ray from said second reflecting surface is parallel to the symmetrical axis.

17. The apparatus of claim 15 wherein said generating means comprises a laser for generating a coherent light ray.

18. The apparatus of claim 15 wherein said first and second points on the inner surface of the deep mirror are diametrically opposite each other with respect to the symmetrical axis.

19. The apparatus of claim 15 further comprising means for positioning said axial reflecting surface to provide fine adjustment for positioning said axial reflecting surface.

20. The apparatus of claim 15 wherein said first and second reflecting surfaces are positioned about the symmetrical axis such that said second reflecting surface is the mirror image of said first reflecting surface and the angle that the reflected light ray input to said detector makes with respect to the symmetrical axis is equal to the angle that the light ray output by said generating means makes with respect to the symmetrical axis.

21. The apparatus of claim 15 wherein said first and second reflecting surfaces and said axial reflecting surface are in a common plane such that all impinging and reflected light rays are also in said common plane.

22. The apparatus of claim 15 wherein said first, second and axial reflecting surfaces are planar for measurement of deep mirrors having a cylindrical or parabolic profile.

23. The apparatus of claim 15 wherein said first and second reflecting surfaces have a profile determined by the profile of the deep mirror such that positional deviations of the detected light ray are the result of imperfections in the optical surface of the deep mirror and not movement of the deep mirror about its symmetrical axis.

24. An apparatus for measuring the optical integrity of the outer reflecting surface of the deep mirror having a symmetrical axis, comprising:
means for generating a light ray directed towards the exterior reflecting surface of the deep mirror and impinging thereon at a first point;
a first stationary reflecting surface disposed external to the deep mirror and in the path of the reflected light ray from said first point and positioned to reflect the light ray to intersect with the symmetrical axis at a predetermined intersection point;
a stationary axial reflecting surface with the reflecting plane thereof disposed normal to the symmetrical axis at the predetermined intersection point;
a second stationary reflecting surface disposed external to the deep mirror and in the path of the reflected light ray from said axial reflecting surface and positioned such that the light ray is reflected therefrom to impinge upon a second point on the exterior surface of the deep mirror the second point symmetrical with respect to the first point and diametrically opposite the symmetrical axis from the first point;
a detector disposed exterior to the deep mirror and positioned to receive the light ray reflected from said second point on the exterior surface of the deep mirror, said detector for detecting positional deviations in the reflected light ray;
means for moving the deep mirror longitudinally along and rotationally about the symmetrical axis relative said first, second and axial surfaces, said generating means and said detector; and
said first and second reflecting surfaces and said axial reflecting surface maintaining the position of the light ray reflected from said second point at an essentially constant angle as the position of the deep mirror is varied longitudinally along and rotationally about the symmetrical axis thereof, positional deviations at said detector indicating imperfections in the optical surface of the deep mirror for any position thereof.

25. The apparatus of claim 24 wherein said first and second reflecting surfaces comprise planar surfaces.

26. The apparatus of claim 24 wherein said first and second reflecting surfaces have a profile determined by the profile of the exterior surface of the deep mirror such that the positional deviations detected by said detector are the result of imperfections in the optical surface of the deep mirror rather than the profile thereof.

27. A method for measuring the optical surfaces of a deep mirror having a symmetrical axis, comprising:
generating a light ray from an originating location;
directing the light ray to impinge upon a first point on the optical surface of the deep mirror;
directing the light ray reflected from the first point to intersect the symmetrical axis at a predetermined intersection point;
disposing a stationary flat reflecting surface at the intersection point and perpendicular to the symmetrical axis;
directing the light ray reflected from the reflecting surface at the intersection point to a second point on the optical surface of the deep mirror, the second point symmetrical with respect to the first point;
directing the light ray from the second point on the surface of the deep mirror to a location external to the deep mirror;
moving the deep mirror longitudinally along and rotationally about the symmetrical axis with respect to the originating and external locations and the reflecting surface; and
detecting positional deviations in the light ray directed to the external location as the deep mirror is moved longitudinally along and rotationally about its symmetrical axis, the positional deviations due to imperfections in the optical surface and contour of the deep mirror.

28. The method of claim 27 wherein the step of directing the light ray to impinge upon the first point utilizes a plurality of intermediate reflections.

29. The method of claim 27 wherein the step of directing the light ray from the first point to the intersection point utilizes a plurality of intermediate reflections therebetween.

30. The method of claim 27 wherein the step of directing the light ray between the intersection point and the second point utilizes a plurality of intermediate reflections therebetween.

31. The method of claim 27 wherein the step of directing the light ray from the second point to the external point utilizes a plurality of intermediate reflections therebetween.

32. The method of claim 27 wherein the first and second points are on diametrically opposite sides of the symmetrical axis.

33. The method of claim 32 wherein the path of the light ray on the side of the symmetrical axis with the first point is the mirror image of the path of the light ray on the side of the symmetrical axis with the second point.

34. The method of claim 27 wherein the step of generating the light ray comprises generating a coherent light ray.

35. The method of claim 27 wherein the step of generating the light ray comprises generating a light ray parallel to the symmetrical axis and the step of directing the light ray to the external point comprises directing the light ray to the external point such that the light ray is parallel to the symmetrical axis.

36. The method of claim 27 wherein the first point, second point, intersection point and the path of all light rays are in a common plane.

37. The method of claim 27 wherein the reflecting surface of the deep mirror is the internal surface and the first and second points are disposed on the internal surface thereof.

38. The method of claim 27 wherein the external surface of the deep mirror is the reflecting surface and the first and second points are disposed on the external surface thereof.

39. A method for measuring the optical integrity of the inner reflecting surface of the deep mirror having a symmetrical axis, comprising:
generating a light ray;
disposing a first stationary reflecting surface interior to the deep mirror at an angle with respect to the symmetrical axis and disposed on one side of the symmetrical axis;
directing the light ray to reflect off of the first reflecting surface and impinge upon a first point on the inner surface of the deep mirror at an angle such that the light ray reflected off of the first point impinges upon the surface of the first reflecting surface, the light ray reflected therefrom intersecting with the symmetrical axis at a predetermined intersection point;
disposing a stationary planar reflecting at the intersection point and perpendicular to the symmetrical axis;
disposing a second stationary reflecting surface at an angle to the symmetrical axis and on the opposite side of the symmetrical axis from the first reflecting surface, the light ray reflected from the planar reflecting surface reflecting off of the second reflecting surface onto a second point on the inner surface of the deep mirror diametrically opposite the symmetrical axis from the first point, the reflected ray therefrom reflecting off of the second reflecting surface to a point external to the deep mirror;
moving the deep mirror longitudinally along and rotationally about its symmetrical axis; and
detecting positional deviations in the light ray reflected off of the second reflecting surface to the external location as the deep mirror is moved longitudinally along and rotationally about the symmetrical axis, any positional deviations due to imperfections in the optical surface and contour of the deep mirror.

40. The method of claim 39 wherein the light ray and all reflections thereof are in a common plane and the path of the light ray from generation to intersection with the symmetrical axis being the mirror image of the path of the light ray between intersection with the symmetrical axis and reflection to the external location.

41. A method for measuring the optical integrity of the external reflecting surface of the deep mirror having a symmetrical axis, comprising:
generating a light ray at an originating location;
directing the light ray to impinge upon a first point on the external surface of the deep mirror;
disposing a stationary reflecting surface external to the deep mirror and positioned in the path of the reflected light ray from the first point, the reflected light ray from the first reflecting surface intersecting the symmetrical axis at a predetermined intersection point;
disposing a planar reflecting surface at the intersection point and perpendicular to the symmetrical axis;
disposing a second reflecting surface external to the deep mirror and opposite the symmetrical axis from the first reflecting surface;
reflecting the light ray from the surface of the planar reflecting surface at the intersection point and directed towards the second reflecting surface for reflection therefrom to impinge upon a second point on the external surface of the deep mirror diametrically opposite the symmetrical axis from the first point, the light ray reflected from the second point reflected to an external location;
moving the deep mirror longitudinally along and rotationally about the symmetrical axis; and
detecting positional deviations in the light ray reflected from the second point to the external location as the deep mirror is moved longitudinally along and rotationally about the symmetrical axis, the positional deviations due to the imperfections in the optical surface and contour of the deep mirror.

* * * * *

UNITED STATES PATENT AND TRADEMARK OFFICE
CERTIFICATE OF CORRECTION

PATENT NO.  : 4,595,288
DATED       : June 17, 1986
INVENTOR(S) : Werner Rambauske It is certified that error appears in the above-identified patent and that said Letters Patent is hereby corrected as shown below:

Col. 8, line 34 (Claim 1), change "and the the" to read
--and the--;

line 45 (Claim 1), change "ight ray" to read
--light ray--.

Col. 9, line 8 (Claim 7), between "direct" and "light ray"
insert --said--;

line 43 (Claim 11), amend the line to read "pinge upon
the first point;

Col. 13, line 23 (Claim 39), between "reflecting" and "at"
insert --surface--.

Signed and Sealed this

Fifth Day of April, 1988

*Attest:*

*Attesting Officer*

DONALD J. QUIGG

*Commissioner of Patents and Trademarks*